United States Patent
Kim

(10) Patent No.: US 9,561,826 B2
(45) Date of Patent: Feb. 7, 2017

(54) DEVICE FOR OPENING AND CLOSING THE ENGINE HOOD OF A CONSTRUCTION MACHINE

(75) Inventor: Seok-Won Kim, Busan (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 249 days.

(21) Appl. No.: 14/352,513

(22) PCT Filed: Oct. 25, 2011

(86) PCT No.: PCT/KR2011/007987
§ 371 (c)(1),
(2), (4) Date: Apr. 17, 2014

(87) PCT Pub. No.: WO2013/062149
PCT Pub. Date: May 2, 2013

(65) Prior Publication Data
US 2014/0252785 A1  Sep. 11, 2014

(51) Int. Cl.
*E05C 17/44* (2006.01)
*B62D 25/12* (2006.01)
(Continued)

(52) U.S. Cl.
CPC ........... *B62D 25/12* (2013.01); *B62D 33/0276* (2013.01); *E02F 3/325* (2013.01); *E02F 9/0833* (2013.01);
(Continued)

(58) Field of Classification Search
CPC ............... Y10T 16/544; Y10T 16/5448; Y10T 16/5453; Y10T 292/65; B62D 33/0276; B62D 25/12; E05D 15/40; E05C 17/24; E05C 9/22; E05C 17/20; E02F 9/0891; E02F 9/0833; E02F 3/325
(Continued)

(56) References Cited

U.S. PATENT DOCUMENTS 899,273 A * 9/1908 Storms ................. E05C 17/166
   292/268
1,613,838 A * 1/1927 Lindeken ................ E05D 15/00
   108/40
(Continued)

FOREIGN PATENT DOCUMENTS

CH   173656 A * 12/1934 ............. E05C 17/28
DE  EP 0284890 A2 * 10/1988 ............. E05C 17/28
(Continued)

OTHER PUBLICATIONS

Office Action issued by the Chinese State Intellectual Property Office (SIPO) dated Sep. 14, 2015 (with English translation) (14 pages).
(Continued)

*Primary Examiner* — Kristina Fulton
*Assistant Examiner* — Christine M Mills
(74) *Attorney, Agent, or Firm* — Harness, Dickey & Pierce, P.L.C.

(57) ABSTRACT

An apparatus for opening and closing an engine hood for a construction machine is disclosed that can open an engine hood at an angle desired by an operator. The apparatus for opening and closing an engine hood includes a frame having one side fixed to an upper swing structure and the other side fixed to a cowl frame, a guide rail having a guide groove formed in a length direction and a plurality of seat portions formed to be cut so as to communicate in a downward direction with respect to the guide groove and maintaining an opening angle that is set to open the engine hood in multiple stages, and a stay rod having a free end slidably formed along the guide rail and a fixed end rotatably fixed to the engine hood.

7 Claims, 2 Drawing Sheets

(51) Int. Cl.
　　　*E05C 9/22*　　　(2006.01)
　　　*E05C 17/20*　　(2006.01)
　　　*B62D 33/027*　(2006.01)
　　　*E05D 15/40*　　(2006.01)
　　　*E02F 3/32*　　　(2006.01)
　　　*E02F 9/08*　　　(2006.01)
　　　*E05C 17/24*　　(2006.01)

(52) U.S. Cl.
　　　CPC .............. *E02F 9/0891* (2013.01); *E05C 9/22* (2013.01); *E05C 17/20* (2013.01); *E05C 17/24* (2013.01); *E05D 15/40* (2013.01); *Y10T 292/65* (2015.04)

(58) Field of Classification Search
　　　USPC ..................... 292/338, 339, 288–290, 292, DIG. 14,292/295–297, 262, 265, 266–270, 273, 274,292/271, 272, 277, 278; 49/324, 339, 356; 248/351; 180/69.2, 69.21; 296/56
　　　See application file for complete search history.

(56)　　　　　References Cited

U.S. PATENT DOCUMENTS

| | | | | |
|---|---|---|---|---|
| 1,986,307 A * | 1/1935 | Wagner | ................... | A45C 13/34 217/60 C |
| 2,551,415 A * | 5/1951 | Calling | ................. | E05C 17/085 217/60 C |
| 2,587,200 A * | 2/1952 | Nottingham | ............ | E05C 17/16 217/60 C |
| 3,398,985 A * | 8/1968 | Rhoades | ................ | B60J 1/1884 217/60 G |
| 4,259,811 A * | 4/1981 | Davis | ...................... | E05C 17/16 292/268 |
| 6,048,018 A * | 4/2000 | Shambeau | ............. | B62D 33/03 296/26.03 |
| 6,892,843 B2 * | 5/2005 | Schillaci | ................. | E05C 17/24 180/274 |
| 7,377,561 B2 * | 5/2008 | Shin | .......................... | E02F 9/00 292/262 |
| 8,166,706 B2 * | 5/2012 | Slimak | .................. | E05B 65/006 16/357 |
| 8,469,130 B2 * | 6/2013 | Werner | .............. | B62D 33/0617 180/89.13 |
| 8,480,141 B2 * | 7/2013 | Lee | ......................... | B62D 25/10 248/351 |
| 8,646,556 B2 * | 2/2014 | Shimada | ................ | B62D 25/10 180/69.2 |
| 8,844,202 B2 * | 9/2014 | Carralero | .................. | E06B 1/52 16/357 |
| 9,004,212 B2 * | 4/2015 | Noda | ..................... | B66C 13/52 16/348 |
| 2006/0082164 A1 * | 4/2006 | Shin | ....................... | B62D 25/12 292/262 |

FOREIGN PATENT DOCUMENTS

| | | | | |
|---|---|---|---|---|
| DE | 19517780 A1 * | 6/1996 | ............. | B62D 25/12 |
| DE | 19517780 A1 | 6/1996 | | |
| FR | 1012114 A * | 7/1952 | ............. | E05C 17/24 |
| GB | 428105 A * | 5/1935 | ............. | E05C 17/24 |
| JP | 58004673 A * | 1/1983 | | |
| JP | H03121089 U * | 12/1991 | | |
| JP | 05-007582 U | 2/1993 | | |
| JP | 07-257434 A | 10/1995 | | |
| JP | 07257434 A * | 10/1995 | | |
| JP | 2004-345555 A | 12/2004 | | |
| JP | 2007069673 A * | 3/2007 | | |
| JP | KR 20070025996 A * | 3/2007 | ............... | E02F 9/00 |
| JP | 2007-112369 A | 5/2007 | | |
| JP | 2007112369 A * | 5/2007 | | |
| JP | 2011-201402 A | 10/2011 | | |
| JP | 2011201402 A * | 10/2011 | | |
| KR | 10-0155656 B1 | 10/1998 | | |
| KR | 10-2005-0006596 A | 1/2005 | | |
| KR | 10-2005-0047660 A | 5/2005 | | |
| WO | WO-2011-093175 A1 | 8/2011 | | |

OTHER PUBLICATIONS

Extended European Search Report for Application No. 11874673.4 dated Sep. 10, 2015 (6 pages).
International Search Report (in Korean and English) and Written Opinion (in Korean) for PCT/KR2011/007987, mailed May 9, 2012; ISA/KR.

* cited by examiner

DEVICE FOR OPENING AND CLOSING THE ENGINE HOOD OF A CONSTRUCTION MACHINE

TECHNICAL FIELD

The present invention relates to an apparatus for opening and closing an engine hood for a construction machine. More particularly, the present invention relates to an apparatus for opening and closing an engine hood for a construction machine, that can open the engine hood, which is mounted on an engine room of a small excavator or the like to be opened and closed by a gas spring so that an operator opens the engine hood during checking and repairing various kinds of components (e.g., an engine and a hydraulic pump) in the engine room, at an angle desired by an operator in accordance with kinds of work to check the components in the engine room.

BACKGROUND ART

In general, in a construction machine such as an excavator, an engine hood is mounted on an engine room to be opened and closed by a gas spring so that an operator can check, repair, and replace components, such as an engine, a hydraulic pump, and various kinds of control valves, which are accommodated in the engine room. In this case, the engine hood is kept in an open state by means of a stay rod having both ends supported by the engine hood and a cowl frame, and thus an operator can check the hydraulic pump or the like in the engine room.

With the recent trend of matching combined functions of a construction machine, such as a small excavator, according to user demands to a middle excavator model, the total height of the machine is becoming heightened. In this case, if the engine hood is opened according to driving of the gas spring in order to repair the components in the engine room installed in the small excavator, the engine hood is automatically opened at the maximum angle according to a stroke of the gas spring regardless of an operator's intention. Due to this, it is not easy for an operator who has a general body shape to hold a handle of the engine hood that is opened at the maximum angle in order to close the engine hood. That is, it is difficult for the operator to close the engine hood of the small excavator after the operator finishes a specific repair work in a state where the engine hood is opened at the maximum angle.

The small excavator is so structured that the operator is unable to rise from the ground up to the excavator, and thus in order to close the engine hood that is opened at the maximum angle, it is required for the operator to rotate an upper swing structure by 90 degrees against a lower driving structure and then to go up a track of a traveling device to cause inconvenience to the operator.

DISCLOSURE

Technical Problem

Therefore, the present invention has been made to solve the above-mentioned problems occurring in the related art, and one subject to be achieved by the present invention is to provide an apparatus for opening and closing an engine hood for a construction machine, which can adjust an opening angle of the engine hood in multiple stages in accordance with kinds of work to check various kinds of components, such as a hydraulic pump, that are accommodated in an engine room of small excavator, and thus can enable an operator to check an engine or the like in a stable posture without the necessity of going up the machine to close the engine hood that is opened at a maximum angle.

Technical Solution

In accordance with an aspect of the present invention, an apparatus for opening and closing an engine hood for a construction machine, in which an engine room is mounted on an upper swing structure and an engine hood is mounted on a cowl frame that forms the engine room to be opened and closed through a gas spring, includes a frame having one side fixed to the upper swing structure and the other side fixed to the cowl frame; a guide rail fixed to one side surface of the frame, and having a guide groove formed in a length direction and a plurality of seat portions formed to be cut so as to communicate in a downward direction with respect to the guide groove and maintaining an opening angle that is set to open the engine hood in multiple stages during driving of the gas spring; and a stay rod having a free end slidably formed along the guide rail and a fixed end rotatably fixed to the engine hood.

The seat portion formed on the guide rail may include a first seat portion on which the free end of the stay rod that slides along the guide groove through the driving of the gas spring is seated to maintain the engine hood at a first set opening angle; and a second seat portion which is formed on the guide rail toward the first seat portion and on which the free end of the stay rod that slides along the guide groove through the driving of the gas spring is seated to maintain the engine hood at a second set opening angle.

The first set opening angle of the engine hood may maintain an angle of 45 degrees when the free end of the stay rod is seated on the first seat portion, and the second set opening angle of the engine hood may maintain an angle of 60 degrees when the free end of the stay rod is seated on the second seat portion.

The apparatus for opening and closing an engine hood according to the aspect of the present invention may further include openings of the first and second seat portions on a side that withdraws from a start end of the guide groove in which the free end of the stay rod is positioned when the engine hood is closed, and projections formed to project from boundary portions of a sliding surface of the guide groove, respectively.

The guide groove formed on the guide rail may include a first sliding surface continued from a start end of the guide groove in which the free end of the stay rod is positioned to the first seat portion when the engine hood is closed; a second sliding surface formed between openings of the first and second seat portions with a height that is relatively higher than a height of the first sliding surface; and a third sliding surface formed between an end of the guide groove in which the free end of the stay rod is positioned and the opening of the second seat portion with a height that is relatively higher than the height of the second sliding surface when the engine hood is opened at a set maximum angle.

A setting hole may be provided which is formed to be cut so as to communicate in an upward direction with respect to the guide groove and secures a space in which a guide roller that makes the free end of the stay rod smoothly slide along the guide groove can be easily coupled to the free end of the stay rod.

Advantageous Effect

The apparatus for opening and closing an engine hood for a construction machine as configured above according to the aspect of the present invention has the following advantages.

Since the engine hood, which is mounted on the engine room of the small excavator to be opened and closed by the gas spring, is opened at an angle desired by the operator, the engine hood is prevented from being opened at the maximum angle against the operator's intention, and thus it is unnecessary for the operator to go up the excavator in order to close the engine hood to secure reliability. Further, it is possible for the operator to check the engine or the like in a stable posture after opening the engine hood to match the kinds of work to check the various kinds of components, and thus convenience can be provided to the operator.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

Figure 1:
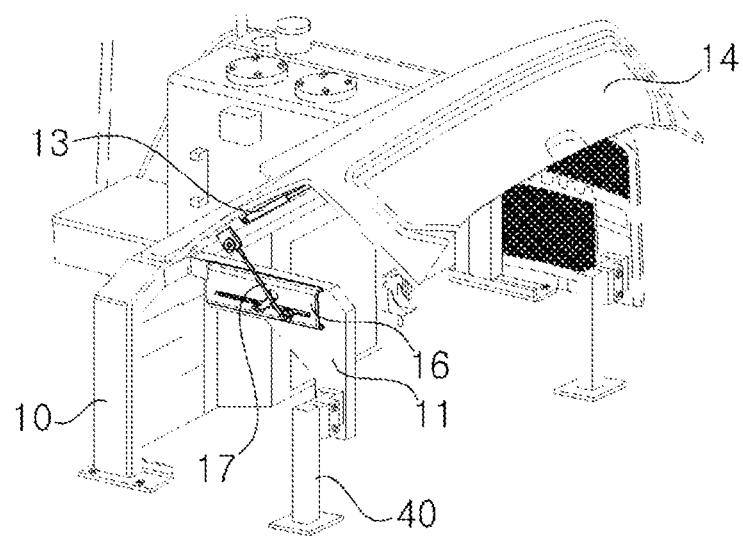
FIG. 1 is a view illustrating a use state of an apparatus for opening and closing an engine hood for a construction machine according to an embodiment of the present invention.

10: cowl frame
11: frame
12: guide groove
13: gas spring
14: engine hood
15: seat portion
16: guide rail
17: stay rod
18: first seat portion
19: second seat portion
20: start end
21, 22: opening
23, 24: projection
25: first sliding surface
26: second sliding surface
27: third sliding surface
28: end
29: guide roller
30: Setting hole

BEST MODE

Hereinafter, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

According to an embodiment of the present invention as illustrated in FIGS. 1 to 3B, an apparatus for opening and closing an engine hood for a construction machine, in which an engine room is mounted on an upper swing structure and an engine hood is mounted on a cowl frame that forms the engine room to be opened and closed through a gas spring, includes a frame 11 having one side fixed to the upper swing structure (not illustrated) and the other side fixed to the cowl frame 10; a guide rail 16 fixed by welding to one side surface of the frame 11, and having a guide groove 12 formed in a length direction and a plurality of seat portions 15 formed to be cut so as to communicate in a downward direction with respect to the guide groove 12 and maintaining an opening angle that is set to open the engine hood 14 in multiple stages during driving of the gas spring 13; and a stay rod 17 having a free end slidably formed along the guide rail 16 and a fixed end rotatably fixed to the engine hood 14 and maintaining the opening angle of the engine hood 14 according to the driving of the gas spring 13.

The seat portion 15 formed on the guide rail 16 includes a first seat portion 18 on which the free end of the stay rod 17 that slides along the guide groove 12 through the driving of the gas spring 13 is seated to maintain the engine hood 14 at a first set opening angle; and a second seat portion 19 which is formed on the guide rail 16 toward the first seat portion 18 (the side near to a working device such as a boom) and on which the free end of the stay rod 17 that slides along the guide groove 12 through the driving of the gas spring 13 is seated to maintain the engine hood 14 at a second set opening angle.

The first set opening angle of the engine hood 14 maintains an angle of 45 degrees when the free end of the stay rod 17 is seated on the first seat portion 18, and the second set opening angle of the engine hood 14 maintains an angle of 60 degrees when the free end of the stay rod 17 is seated on the second seat portion 19.

Figure 3A:
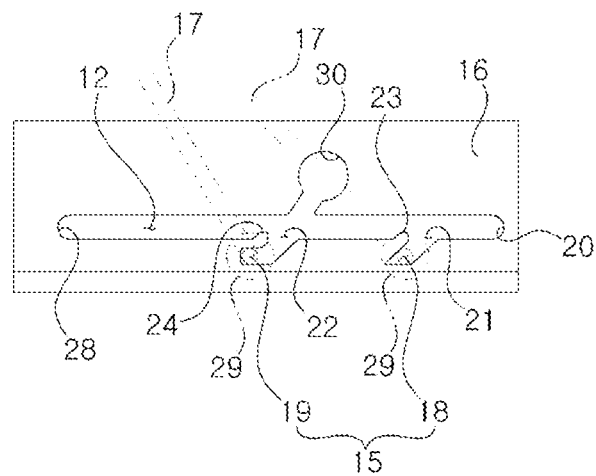
FIGS. 3A and 3B are views illustrating modified examples of a frame on which a stay rod slides in an apparatus for opening and closing an engine hood for a construction machine according to an embodiment of the present invention

As shown in FIG. 3A, the apparatus for opening and closing an engine hood according to an embodiment of the present invention further includes openings 21 and 22 of the first and second seat portions 18 and 19 on a side that withdraws from a start end 20 of the guide groove 12 in which the free end of the stay rod 17 is positioned when the engine hood 14 is closed, and projections 23 and 24 formed to project from boundary portions of a sliding surface of the guide groove 12, respectively.

Through this, if the engine hood 14 is opened by the driving of the gas spring 13, a guide roller 29 of the stay rod 17, which slides along the guide groove 12, may be interfered with the projection 23 to be seated on the first seat portion 18, and may be interfered with the projection 24 to be seated on the second seat portion 19.

Figure 3B:
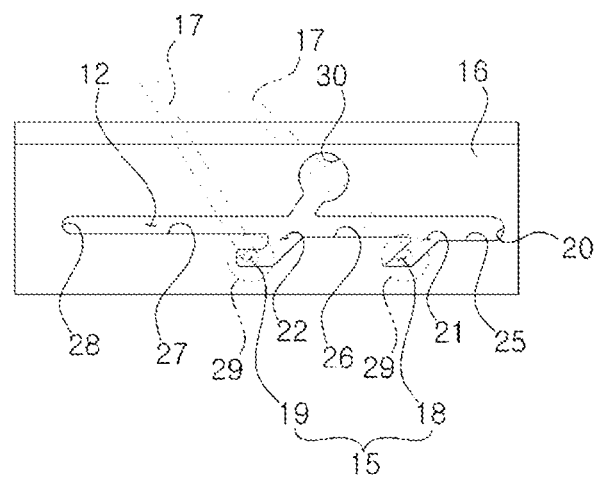

As shown in FIG. 3B, the guide groove 12 formed on the guide rail 16 includes a first sliding surface 25 continued from a start end 20 of the guide groove 12 in which the free end of the stay rod 17 is positioned to the first seat portion 18 when the engine hood 14 is closed; a second sliding surface 26 formed between openings 21 and 22 of the first and second seat portions 18 and 19 with a height that is relatively higher than a height of the first sliding surface 25; and a third sliding surface 27 formed between an end 28 of the guide groove 12 in which the free end of the stay rod 17 is positioned and the openings 21 and 22 of the second seat portion 19 with a height that is relatively higher than the height of the second sliding surface 26 when the engine hood 14 is opened at a set maximum angle.

Through this, if the engine hood 14 is opened by the driving of the gas spring 13, the guide roller 29 of the stay rod 17 slides along the first sliding surface 25, and is interfered with the second sliding surface 26 to be seated on the first seat portion 18. Further, the guide roller 29 slides along the second sliding surface 26, and is interfered with the third sliding surface 27 to be seated on the second seat portion 19.

A circular setting hole 30 is provided which is formed to be cut so as to communicate in an upward direction with respect to the guide groove 12 and secures a space in which the guide roller 29 that makes the free end of the stay rod 17 smoothly slide along the guide groove 12 can be easily coupled to the free end of the stay rod 17.

In the drawing, the unexplained reference numeral "40" is a bracket that supports the frame 11 on the upper swing structure.

Hereinafter, a use example of the apparatus for opening and closing an engine hood for a construction machine according to an embodiment of the present invention will be described in detail with reference to the accompanying drawings.

Figure 2:
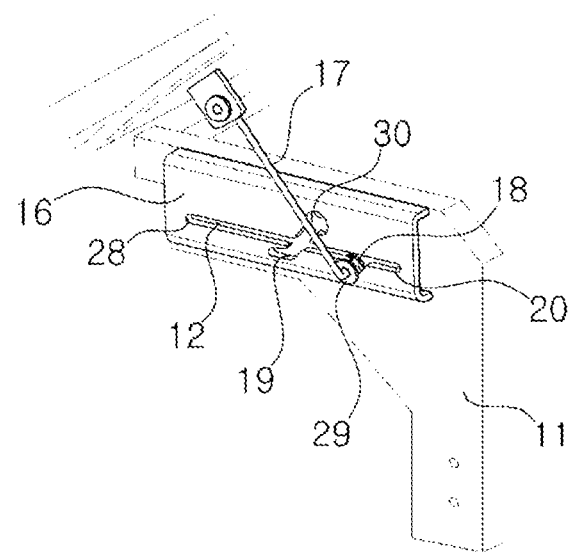
FIG. 2 is a view illustrating a main portion of an apparatus for opening and closing an engine hood for a construction machine according to an embodiment of the present invention.

Referring to FIGS. 1 and 2, if the engine hood 14 is opened to perform checking, repairing, or replacement of the engine, the hydraulic pump, or the various kinds of control valves MCV, which are installed in the engine room, the operator operates an operation lever (not illustrated) to drive the gas spring 13, and the engine hood 14 is opened in multiple stages (e.g., at angles of 45 degrees and 60 degrees) about a hinge shaft (not illustrated) mounted on the cowl frame 10 as a center shaft.

In this case, as shown in FIGS. 2, 3A, and 3B, if the operator drives the gas spring 13 to open the engine hood 14, the guide roller 29, which is mounted at the free end of the stay rod 17 that is positioned at the start end 20 of the guide groove 12 (the engine hood 14 is in a closed state), slides along the guide groove 12 in the left direction in the drawing.

In this case, while the guide roller 29 slides along the guide groove 12, an external force is applied to the stay rod 17 in the axis direction due to the force of the gas spring 13 and the self-weight of the engine hood 14, and thus the guide roller 29 is seated on the first seat portion 18 through the opening 21 that is formed to be cut so as to communicate in the downward direction with respect to the guide groove 12.

Accordingly, the engine hood 14 is automatically opened at a set angle of 45 degrees according to the driving of the gas spring 13. Accordingly, in a state where the engine hood 14 is opened at the angle of 45 degrees, the operator can perform checking or repairing of the corresponding component mounted in a position adjacent to the opening of the engine room.

On the other hand, if the operator opens the engine hood 14 at the set angle of 60 degrees to perform checking or repairing of the various kinds of control valves (e.g., MCV) that are installed in a deep position inside the engine room, the operator lifts the guide roller 29 of the stay rod 17 that is positioned on the first seat portion 18 from the first seat portion 18 through the opening 21 to make the guide roller 29 secede from the first seat portion 18.

In this case, by the driving of the gas spring 13, the guide roller 29 slides along the guide groove 12 in the left direction in the drawing. At this time, since the external force is applied to the stay rod 17 in the axis direction due to the force of the gas spring 13 and the self-weight of the engine hood 14, the guide roller 29 is seated on the second seat portion 19 through the opening 22 that is formed to be cut so as to communicate in the downward direction with respect to the guide groove 12.

Accordingly, the engine hood 14 is automatically opened at the set angle of 60 degrees according to the driving of the gas spring 13. Accordingly, in a state where the engine hood 14 is opened at the angle of 60 degrees, the operator can perform checking or repairing of the various kinds of control valves that is installed in the deep position inside the engine room.

On the other hand, if the operator lifts the guide roller 29 from the second seat portion 19 through the opening 22 to make the guide roller 29 secede from the second seat portion 19, the guide roller 29 slides in the left direction in the drawing through the gas spring 13 and is positioned at the end 28 of the guide groove 12. That is, the engine hood 14 can be opened at the maximum angle (e.g., the angle of 80 degrees) by the driving of the gas spring 13.

As described above, the engine hood 14 can be opened selectively at the angle of 45 degrees or 60 degrees through the driving of the gas spring 13 according to the kinds of work to check and repair the components installed inside the engine room of the small excavator. Accordingly, it is unnecessary for the operator to go up the excavator through the track for traveling or the like in order to close the engine hood 14 after the checking or repairing of the component in the engine room is completed in a state where the engine hood 14 (especially the engine hood of the small excavator) is opened at the maximum angle.

On the other hand, since the circular setting hole 30 is formed to be cut so as to communicate in the upward direction with respect to the guide groove 12, workability can be improved in coupling the guide roller 29 to the free end of the stay rod 17 or separating the guide roller 29 from the free end of the stay rod 17.

On the other hand, by making the guide roller 29 that is mounted on the lower end portion of the stay rod 17 secede from the second seat portion 19 after the checking or repairing of the corresponding component in the engine room is completed, the guide roller 29 slides along the guide groove 12 in the right direction in the drawing through the gas spring 13. That is, since the guide roller 29 moves along the guide groove 12 and is positioned at the start end 20 of the guide groove 12, the engine hood 14 can be closed with respect to the cowl frame 10.

INDUSTRIAL APPLICABILITY

As apparent from the above description, according to the apparatus for opening and closing an engine hood for a construction machine according to an embodiment of the present invention, the engine hood can be opened at the angle desired by the operator during checking the various components, such as the hydraulic pump, accommodated in the engine room of the small excavator or the like. Accordingly, the engine hood is prevented from being opened at the maximum angle against the operator's intention, and thus it is unnecessary for the operator to go up the excavator in order to close the engine hood.

The invention claimed is:
1. An apparatus for opening and closing an engine hood for a construction machine, in which an engine room is mounted on an upper swing structure and the engine hood is mounted on a cowl frame that forms the engine room to be opened and closed through a gas spring, comprising:

a frame having a first side fixed to the upper swing structure and a second side fixed to the cowl frame;
a stay rod having a free end slidably positioned along a guide rail, and a fixed end rotatably fixed to the engine hood;
the guide rail fixed to one of the first side or the second side, and having a guide groove formed in a length direction and a plurality of seat portions downwardly formed to be separately situated in the guide groove so as to communicate with the guide groove, thus maintaining the stay rod in a predetermined opening angle that is to be adjusted with the plurality of seat portions, separately;
the plurality of seat portions formed on the guide rail include:
  a first seat portion on which the free end of the stay rod is seated to maintain the engine hood at a first predetermined opening angle; and
  a second seat portion on which the free end of the stay rod is seated to maintain the engine hood at a second predetermined opening angle, the second seat portion is formed apart from the first seat portion;
the first seat portion and the second seat portion extend from a first side of the guide groove which is opposite to a second side of the guide groove, the first side of the guide groove is further from the engine hood than the second side of the guide groove;
the guide groove formed on the guide rail includes:
  a first sliding surface extending in a first plane from an end of the guide groove to the first seat portion, the engine hood being closed at a location where the stay rod is positioned on the end of the guide groove;
  a second sliding surface extending in a second plane between the first seat portion and the second seat portion, the second plane is closer to the second side of the guide groove than the first plane; and
  a third sliding surface extending in a third plane from the second seat groove to a second end of the guide groove, the engine hood being opened at a location where the stay rod is positioned on the second end of the guide groove at a predetermined maximum angle, and the third plane is closer to the second side of the guide groove than each of the first plane and the second plane.

2. The apparatus according to claim 1, wherein the first set opening angle of the engine hood maintains an angle of 45 degrees when the free end of the stay rod is seated on the first seat portion, and the second set opening angle of the engine hood maintains an angle of 60 degrees when the free end of the stay rod is seated on the second seat portion.

3. The apparatus according to claim 1, further comprising projections formed to project from boundary portions of a sliding surface of the guide groove, respectively.

4. The apparatus according to claim 1, wherein a setting hole is formed upwardly with respect to a surface of the guide groove.

5. An apparatus for opening and closing an engine hood for a construction machine having an engine room mounted on an upper swing structure, the engine hood is mounted on a cowl frame that forms the engine room and is moved to an open position with a gas spring, the apparatus comprising:
a frame having a first side fixed to the upper swing structure, and a second side fixed to the cowl frame;
a guide rail fixed to the frame
a guide groove defined by the guide rail, the guide groove extends between a first end and a second end, the first end is distal to a hinge point of the engine hood and the second end is proximate to the hinge point of the engine hood;
a first seat portion and a second seat portion, each one of which is defined by the guide rail to extend from a first side of the guide groove at an angle extending away from the first end of the guide groove, the first seat portion is closer to the first end than the second seat portion, the first side is opposite to a second side of the guide groove, the first side is further from the engine hood than the second side;
a first sliding surface of the guide groove extends in a first plane between the first end of the guide groove and the first seat portion;
a second sliding surface of the guide groove extends in a second plane between the first seat portion and the second seat portion, the second plane is closer to the second side of the guide groove than the first plane;
a third sliding surface of the guide groove extends in a third plane between the second seat portion and the second end of the guide groove, the third plane is closer to the second side of the guide groove than each of the first plane and the second plane; and
a stay rod having a fixed end secured to the engine hood and a second end slidably movable along the guide rail;
wherein:
  the second end of the stay rod is seated on the first sliding surface when the engine hood is closed;
  the second end of the stay rod is seated within the first seat portion to support the engine hood open at a first angle;
  the second end of the stay rod is seated within the second seat portion to support the engine hood open at a second angle that is greater than the first angle; and
  the second end of the stay rod is seated on the third sliding surface when the engine hood is opened at a maximum angle.

6. The apparatus of claim 5, wherein the first angle is 45 degrees and the second angle is 60 degrees.

7. The apparatus of claim 5, further comprising a setting hole defined by the guide rail and extending from the second side of the guide groove towards the first end of the guide rail.

* * * * *